United States Patent
Venkatesan et al.

(10) Patent No.: US 9,697,792 B2
(45) Date of Patent: Jul. 4, 2017

(54) MULTI-PROTOCOL SUPPORT FOR DISPLAY DEVICES

(71) Applicants: Sriram Venkatesan, Folsom, CA (US); Sanjib Sarkar, Folsom, CA (US)

(72) Inventors: Sriram Venkatesan, Folsom, CA (US); Sanjib Sarkar, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 304 days.

(21) Appl. No.: 14/489,512

(22) Filed: Sep. 18, 2014

(65) Prior Publication Data

US 2016/0086564 A1  Mar. 24, 2016

(51) Int. Cl.
 *G06F 3/038* (2013.01)
 *G09G 5/00* (2006.01)
 *H04L 25/02* (2006.01)

(52) U.S. Cl.
 CPC ............... *G09G 5/00* (2013.01); *G09G 5/006* (2013.01); *H04L 25/028* (2013.01); *G09G 2370/10* (2013.01)

(58) Field of Classification Search
 CPC ...... G09G 5/00; G09G 5/006; G09G 2370/10; H04L 25/028
 USPC .......... 345/212, 502–520; 710/105, 306, 315
 See application file for complete search history.

(56) References Cited

U.S. PATENT DOCUMENTS

| | | | | |
|---|---|---|---|---|
| 2014/0094128 A1* | 4/2014 | Yu | ...................... | G06F 13/4072 455/68 |
| 2014/0281154 A1* | 9/2014 | Hashimoto | ........ | G11C 29/1201 711/103 |
| 2015/0319108 A1* | 11/2015 | Maung | ................ | H04L 12/6418 370/359 |

* cited by examiner

*Primary Examiner* — Kent Chang
*Assistant Examiner* — Andrew Lee
(74) *Attorney, Agent, or Firm* — The Law Office of Herbert T. Patty (57) ABSTRACT

Systems and methods of the present disclosure include transmitter devices. The transmitter devices include a high-speed driver domain having a low-dropout regulator. The low-dropout regulator reduces a voltage level from an input voltage source to the high-speed driver domain. In addition, the transmitter devices include a low-speed driver domain. The low-speed driver domain includes a pre-driver which reduces a voltage level from an input voltage source to the low-speed driver domain.

20 Claims, 7 Drawing Sheets

MULTI-PROTOCOL SUPPORT FOR DISPLAY DEVICES

FIELD

This disclosure pertains to transmitter architectures, and in particular (but not exclusively), to transmitter devices that accommodate both high-speed and low-swing transmission requirements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 1:
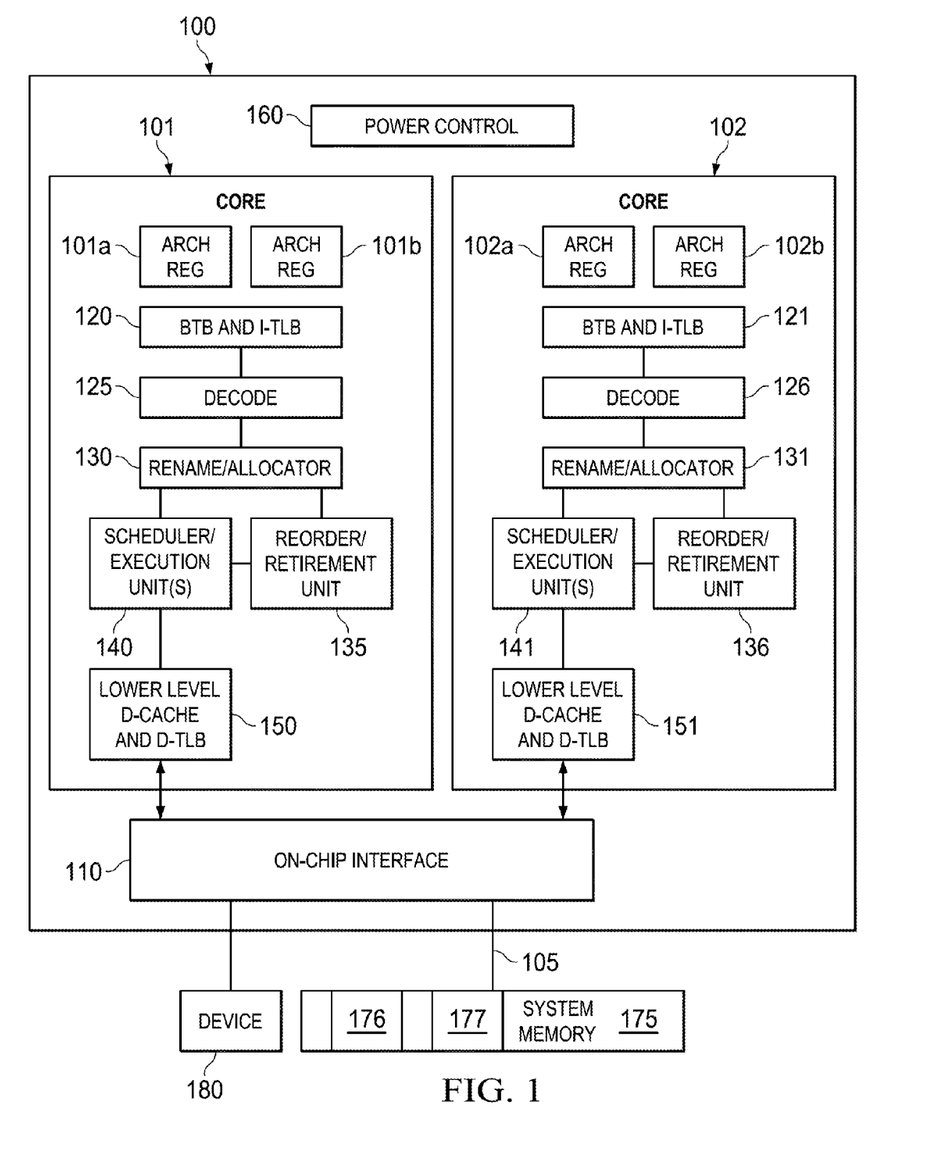
FIG. 1 is a diagram illustrating an embodiment of a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be asymmetric or symmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Allocator and renamer block 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further away from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as a multi-drop bus, point-to-point interconnect, serial interconnect, parallel bus, coherent (e.g. cache coherent) bus, layered protocol architecture, differential bus, or a GTL bus.

Memory 175 may be dedicated to processor 100 or shared with other devices in a system. Common examples of types of memory 175 include DRAM, SRAM, non-volatile memory, and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. In some implementations, during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Systems and methods of the present disclosure include transmitter devices. The transmitter devices include a high-speed driver domain having a low-dropout regulator. The low-dropout regulator reduces a voltage level from an input voltage source to the high-speed driver domain. In addition, the transmitter devices include a low-speed driver domain. The low-speed driver domain includes a pre-driver which reduces a voltage level from an input voltage source to the low-speed driver domain.

Figure 2:
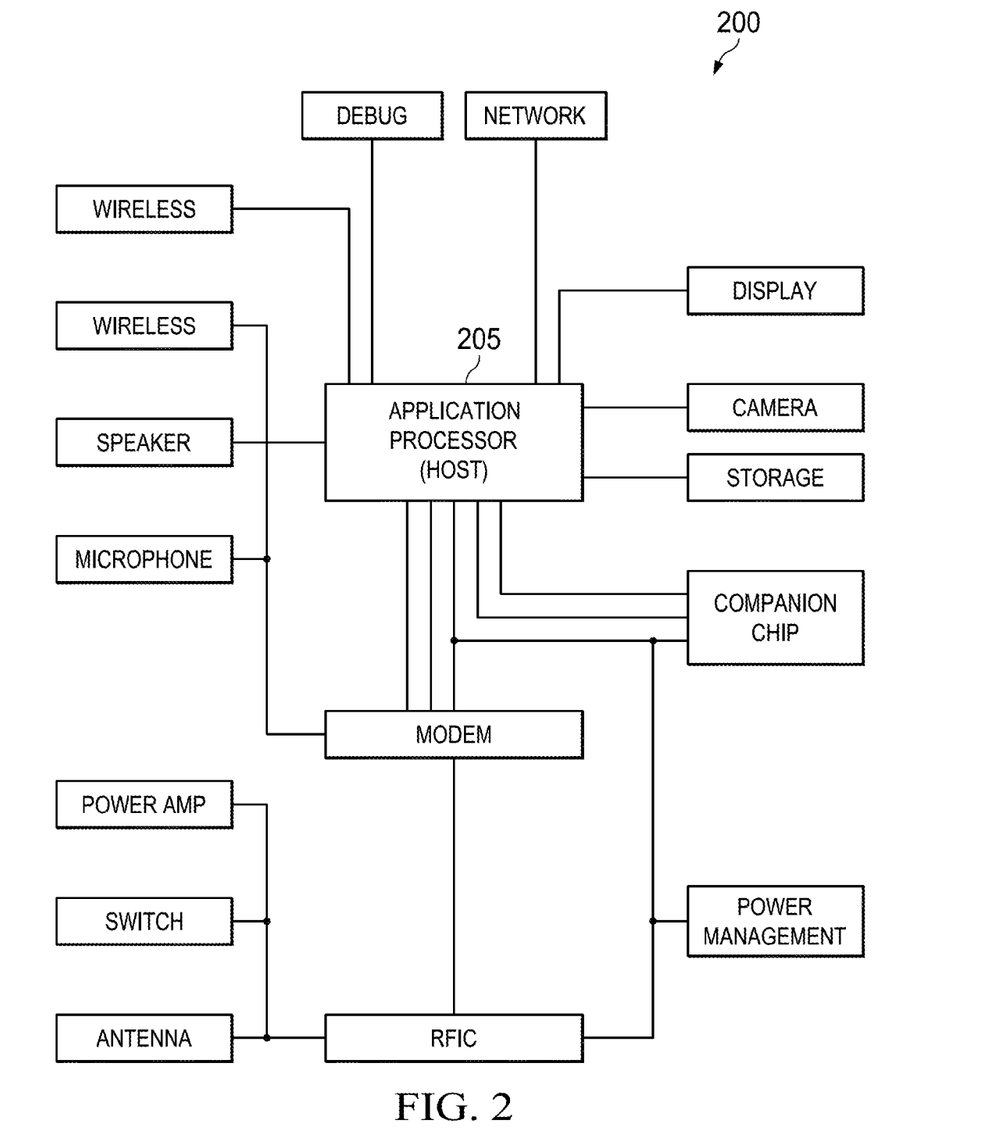
FIG. 2 is a diagram illustrating an embodiment of a low-power computing platform.

Referring to FIG. 2, an embodiment of a low power computing platform is depicted. In one embodiment, low-power computing platform 200 includes various devices including a user endpoint, such as a phone, smartphone, tablet, notebook (e.g., ultraportable notebook), desktop, server, transmitting device, receiving device, or any other known or available computing platform. The illustrated platform depicts a number of different interconnects to couple multiple different devices. Exemplary discussion of these interconnects are provided below to provide options for implementation and inclusion. However, a low power platform 200 is not required to include or implement the depicted interconnects or devices. Furthermore, other devices and interconnect structures that are not specifically shown may be included.

Starting at the center of the diagram, platform 200 includes application processor 205. Often this includes a low power processor, which may be a version of a processor configuration described herein or known in the industry. As one example, processor 200 is implemented as a system on a chip (SoC). As a specific illustrative example, processor 200 includes an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor.

Figure 3:
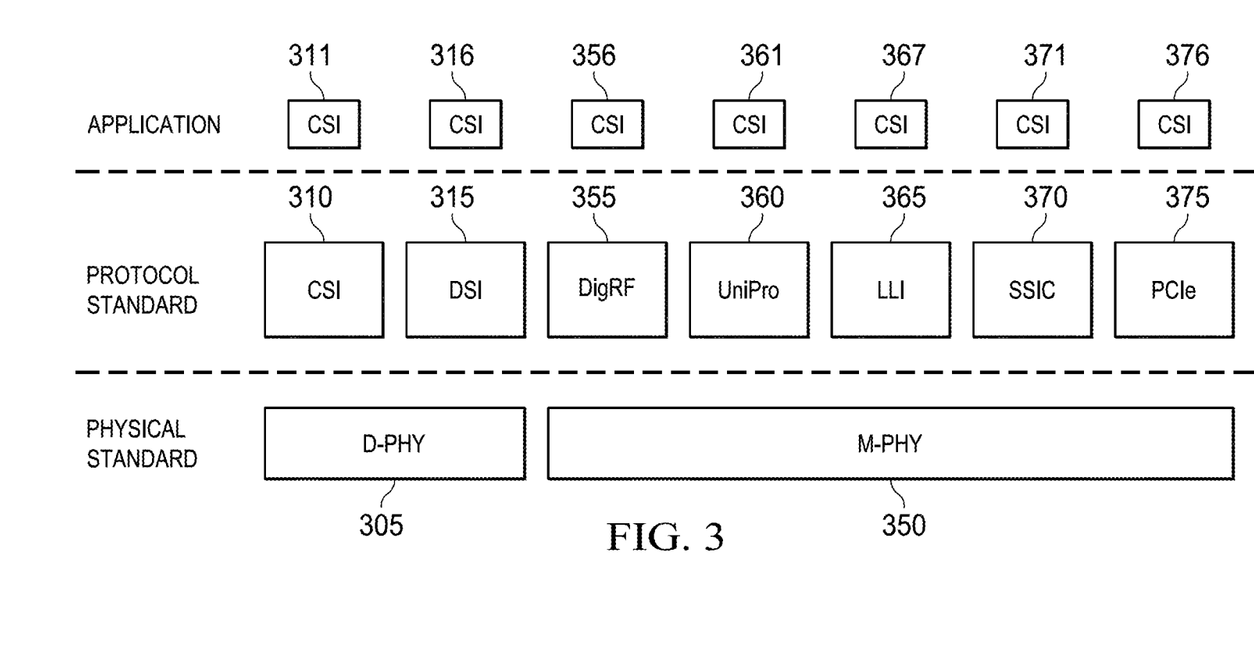
FIG. 3 is a diagram illustrating an embodiment of a low-power data transmission platform.

FIG. 3 is a diagram illustrating an embodiment of a low power data transmission platform. As shown, an application layer, protocol standard layer, and physical standard layer are displayed in the figure. In particular, the application layer provides various instances of a camera serial interface (CSI)—311, 316, 356, 361, 367, 371, and 376. Notably, CSI may include a unidirectional differential serial interface to transmit data and clock signals.

The protocol standard layer includes another instance of a CSI interface 310 and a Digital Serial Interface (DSI) 315. DSI may define a protocol between a host processor and a peripheral device using a D-PHY physical interface. In addition, the protocol standard layer includes a DigRF interface 355, UniPro interface 360, Low Latency Interface (LLI) 365, SuperSpeed Inter-Chip (SSIC) interface 370, and Peripheral Component Interconnect Express (PCIe) 375 interface.

Lastly, the physical standard layer provides a D-PHY sub-layer 305. It may be understood by one having ordinary skill in the art that D-PHY sub-layer 305 includes a physical layer solution upon which MIPI camera interfaces, display serial interfaces, and general purpose high-speed/low-power interfaces are based. In addition, the physical standard layer includes a M-PHY sub-layer 350 which is the successor of D-PHY, requiring less pins and providing more bandwidth per pin (pair) with improved power efficiency.

MIPI D-PHY, MIPI M-PHY, embedded DisplayPort (eDP), and DisplayPort (DP) are I/O protocols presently used for display panels in tablets, 2-in-1's, Ultrabook and desktop products. MIPI D-PHY protocol-based display panels are relatively inexpensive but capable of lower resolution compared to eDP/DP protocol-based panels, which may be more expensive but have higher resolution display capabilities.

While MIPI D-PHY supports up to 1.5 Gigabytes per second (Gb/s) data-rates, MIPI M-PHY, an enhancement thereof, supports data rates up to 5.8 Gb/s and may be used in future display panels with higher resolution capability. The DisplayPort protocol may necessitate 8.1 Gb/s data rates to support 8K resolution panels. OEM and ODMs often demand flexibility in choosing a preferred display panel to optimize cost and resolution needs for specific products.

The present disclosure provides a common PHY with the capability to accommodate MIPI D-PHY, MIPI M-PHY, or eDP/DP protocols which significantly reduce the area needed for two individual PHY's on a single chip. Accordingly, the present disclosure provides a transmitter device which supports MIPI D-PHY, MIPI M-PHY, and eDP/DP modes.

The present disclosure further provides a novel transmitter architecture that seamlessly configures the high-speed portion of the transmitter as an eDP/DP transmitter with 8.1 Gb/s transmission rates, or alternatively, as a MIPI D-PHY or M-PHY transmitter (1.5 Gb/s-5.8 Gb/s) with an architecture that serves wide frequency range with low-pad capacitance thereby supporting wide-voltage swing specs of different PHY's without incurring extra overhead with regards to die area, power, and pad capacitance. Additionally, the transmitter architecture described herein supports low-speed and high-voltage (1.2 V) requirements without the need for thick transistor gates.

The transmitter architecture described in the present disclosure is suitable to support data rates from 1.0 Gb/s to 8.1 Gb/s based on a combination design which features an inherent advantage in terms of pad capacitance. For instance, the resistor elements of the transmitter architecture are shielded from the pad node by the transistor switches such that the tunable resistor legs do not contribute to the pad capacitance which limit high-speed functionality.

In addition, the transmitter architecture described herein addresses the variable swing specs required by the various display interfaces with a wide-range low-dropout regulator (LDO). For example, some DisplayPort protocols require a $V_{diff\ (p-p)}$ swing requirement from 200 mV to 1.2V and the high-speed mode D-PHY requires a 400 mV $V_{diff(p-p)}$ which both may be accommodated by a single transmitter structure by a LDO component.

Advantageously, a transmitter architecture has minimal area overhead. In particular, the transmitter structure requires less die area than would be required for individual transmitters designed for specific display protocols. Accordingly, the present disclosure provides a transmitter architecture that saves die area while providing OEM/ODM customers with display interface flexibility.

Furthermore, the present disclosure provides high transmitter performance to support eDP/DP and MIPI D/M-PHY high-speed transactions which cannot be degraded due to functionality combinations. Data rates as high as 8.1 Gb/s may be achieved which may need less than 1 pf pad capacitance on the transmitter pads for electrical robustness. As such, only a single common core transmitter structure gets reused for all high-speed transmissions while minimizing the number of additional structures connected to the pad node.x In addition, because power is critical for display PO's, battery life significantly depends on the display power. Therefore, the present disclosure provides a transmitter architecture which does not increase power overhead compared to native MIPI or eDP transmitters.

Lastly, MIPI D-PHY specs require that the transmitter structure be capable of driving low-speed (e.g., 1.2V), singled-ended, rail-to-rail swings. The transmitter architecture disclosed herein has the capability to withstand 1.2V.

Figure 4:
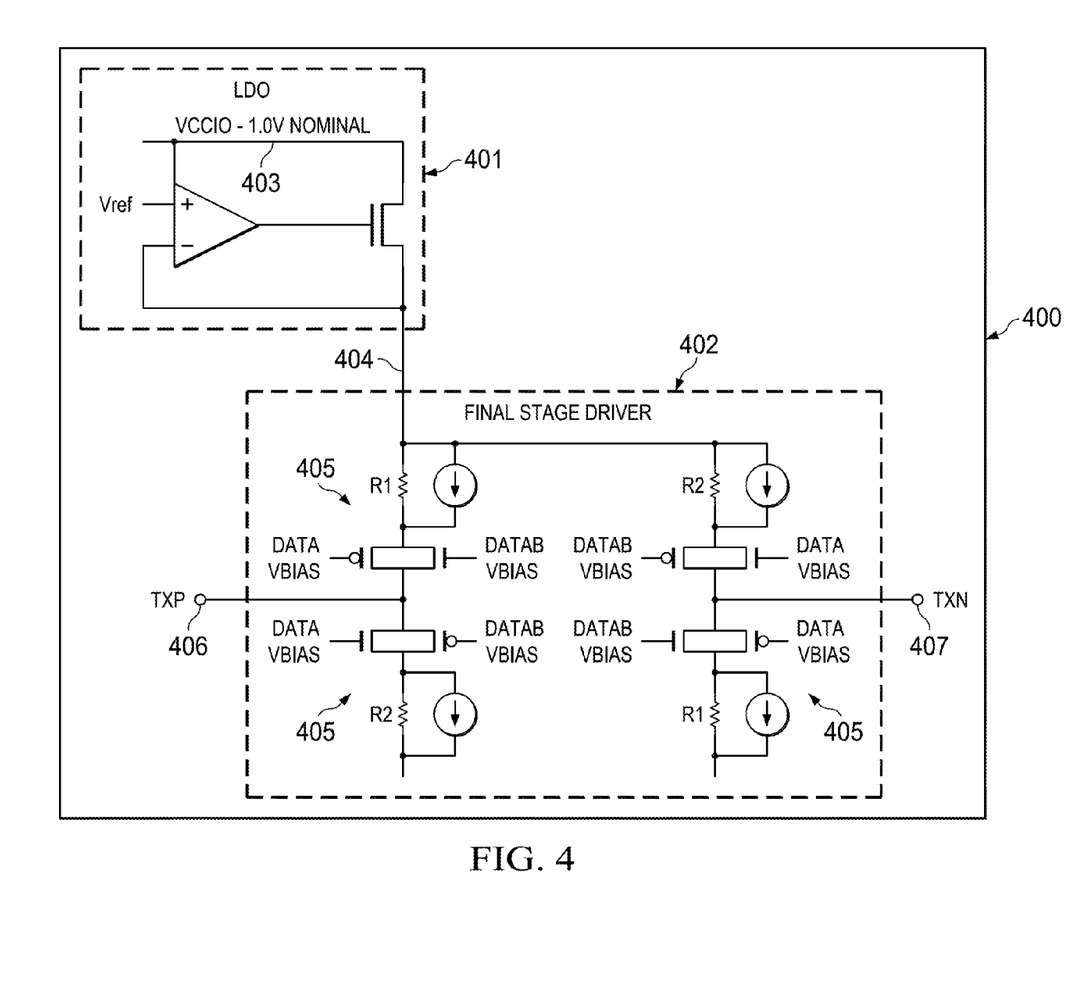
FIG. 4 is a diagram illustrating an embodiment of a high-speed driver domain having a low-dropout regulator coupled thereto within a transmitter architecture.

FIG. 4 is a diagram illustrating an embodiment of a high-speed driver domain 400 having a low-dropout regulator (LDO) 401 coupled thereto within a transmitter architecture. In particular, the transmitter architecture may be implemented in 10 nm/14 nm thin-gate-based voltage mode transmitters. Those having ordinary skill in the art may appreciate that the transmitter architecture described in the present disclosure is typically integrated within a display input/output (I/O) physical layer (PHY) (e.g., MIPI D-PHY, MIPI M-PHY, DisplayPort PHY, or embedded DisplayPort PHY).

High-speed driver domain 400 includes a final stage driver 402 which includes a plurality of least-significant bit (LSB) cells. In some embodiments, final stage driver 402 includes 128 LSB cells. It should be understood, however, that the present disclosure is not limited to any specific number of LSB cells.

In some embodiments, final stage driver 402 does not include a precision resistor as included in many legacy transmitter devices. Final stage driver 402 does not include a precision resistor, in part, to reduce process costs. However, the present disclosure is not limited to non-precision resistor architectures. A transmitter device consistent with the present disclosure benefits from a relatively low capacitance to achieve high data rates. For example, to achieve data rates as high as 8.1 Gb/s, less than 1 pf pad capacitance on the transmitter pads may be required. In some embodiments, a pad capacitance of approximately 0.85 pf may be exhibited for transmission rates as high as 8.1 Gb/s. During operation, socket pins 406, 407 (one high, the other low) which connect to the external world exhibits a capacitance that is relatively low such that the transmitter device can reach high data rates.

In some implementations, LDO 401 supplies voltage to the final stage driver 402 and may be employed when the display PHY requires an output voltage that is less than the voltage from an input voltage source (e.g., voltage rail). For instance, LDO 401 may be coupled to an input rail voltage 403 which feeds into the final stage driver 402 of the high-speed driver domain 400. In some embodiments, input rail voltage 403 may be set to 1.0V.

For example, if the transmitter device is to support a DisplayPort PHY, LDO 401 may reduce the voltage from 1V, for example, to 0.4V, 0.6V, or 0.8V. In other instances, when the transmitter device is in a MIPI D-PHY mode, LDO 401 reduces the voltage to 0.4V.

Currently, DisplayPort display protocol may require a $V_{diff(p-p)}$ swing requirement from 200 mV to 1.2V whereas the high-speed mode D-PHY may require a 400 mV $V_{diff(p-p)}$. In some embodiments of the present disclosure, the lower swings are accomplished by reducing the LDO output voltage as appropriate for the various display protocols. Most notably, the swing requirements from MIPI and eDP. It is to be noted that each swing requirement may be met with one common LDO 401 per lane.

As such, employing the LDO 401 within the transmitter structure solves the problems associated with swing control. Advantageously, pad capacitance will not be prohibitively high for high-speed modes (e.g., 8.1 Gb/s). In essence, the final stage driver 402 of the high speed driver domain 400 is driven by the LDO 401 instead of the native power supply. In some implementations, LDO 401 provides a power supply rejection ration (PSRR). Alternatively, implementing LDO 401 to control the swing levels for thick-gate-based low-speed transmitters may also be employed.

In some implementations, when the transmitter structure is to support a high-speed display mode (e.g., for voltages greater than or equal to 1.0V), LDO 401 is bypassed and the low-speed driver is employed. In these implementations, LDO 401 will be bypassed and the I/O rail voltage (e.g., 1V) will be applied to the transmitter structure.

The transmitter architecture of the present disclosure further provides electrical oxide stress (EOS) junction support for thin-gate devices as shown in FIG. 4. In some embodiments, the high-speed driver domain 400 portion of the transmitter structure is completely gated with switches parked with a gate voltage such that $V_{gs}/V_{gd}<1V$ which is achieved by muxing between high-speed data and a bias voltage 405 during low-speed (e.g., 1.2V) swing transmission. The bias voltage may be set to any suitable value. In some embodiments, the bias voltage is set to 0.5V.

Figure 5:
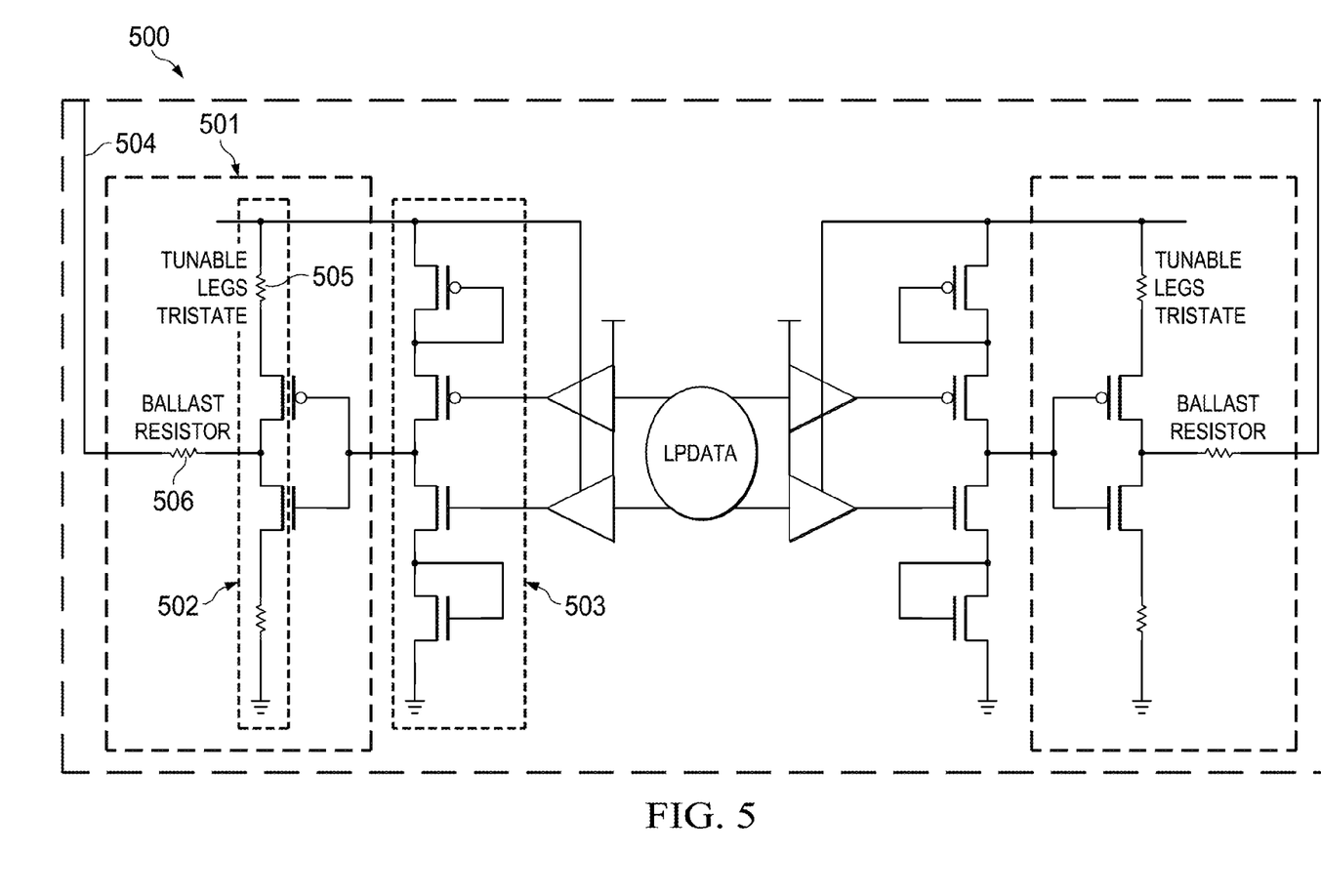
FIG. 5 is a diagram illustrating an embodiment of a low-speed driver domain having a pre-driver coupled thereto within a transmitter architecture.

FIG. 5 is a diagram illustrating an embodiment of a low-speed driver domain 500 (low speed driver 500) having a pre-driver 503 coupled to a final stage driver 501 within a transmitter architecture. It should be understood by one having ordinary skill in the art that final stage driver 501 is one (e.g., a single slice) of several instantiations.

In some embodiments, input gates of a low-speed driver 500 are driven by pre-driver 503 that is level shifted to 0.5V. The low-speed driver 500 may be shielded from the high-speed domain via a ballast resistor 506. In some embodiments, low-speed driver 500 is implemented with a layout-only cell which does not impact the pad capacitance. Ballast resistor 506 is coupled to low-voltage rail 504 and provides protection to the low-speed driver 500.

Low-speed driver 500 includes a plurality of tunable resistor legs 505 which may include NMOS resistor legs 507. In some embodiments, NMOS resistor legs 507 may have a target resistance of approximately 200 ohms. Input gates of low-speed driver 500 may be driven by a pre-driver 503 that may be level shifted (e.g., 0.2V-0.3V) to a lower voltage (e.g., 0.9V-1.0V). The low-speed driver 500 is shielded from the high-speed driver by the ballast resistor 506 which is implemented with a layout-only cell that does not impact the pad capacitance to the high-speed transmitter.

Figure 6:
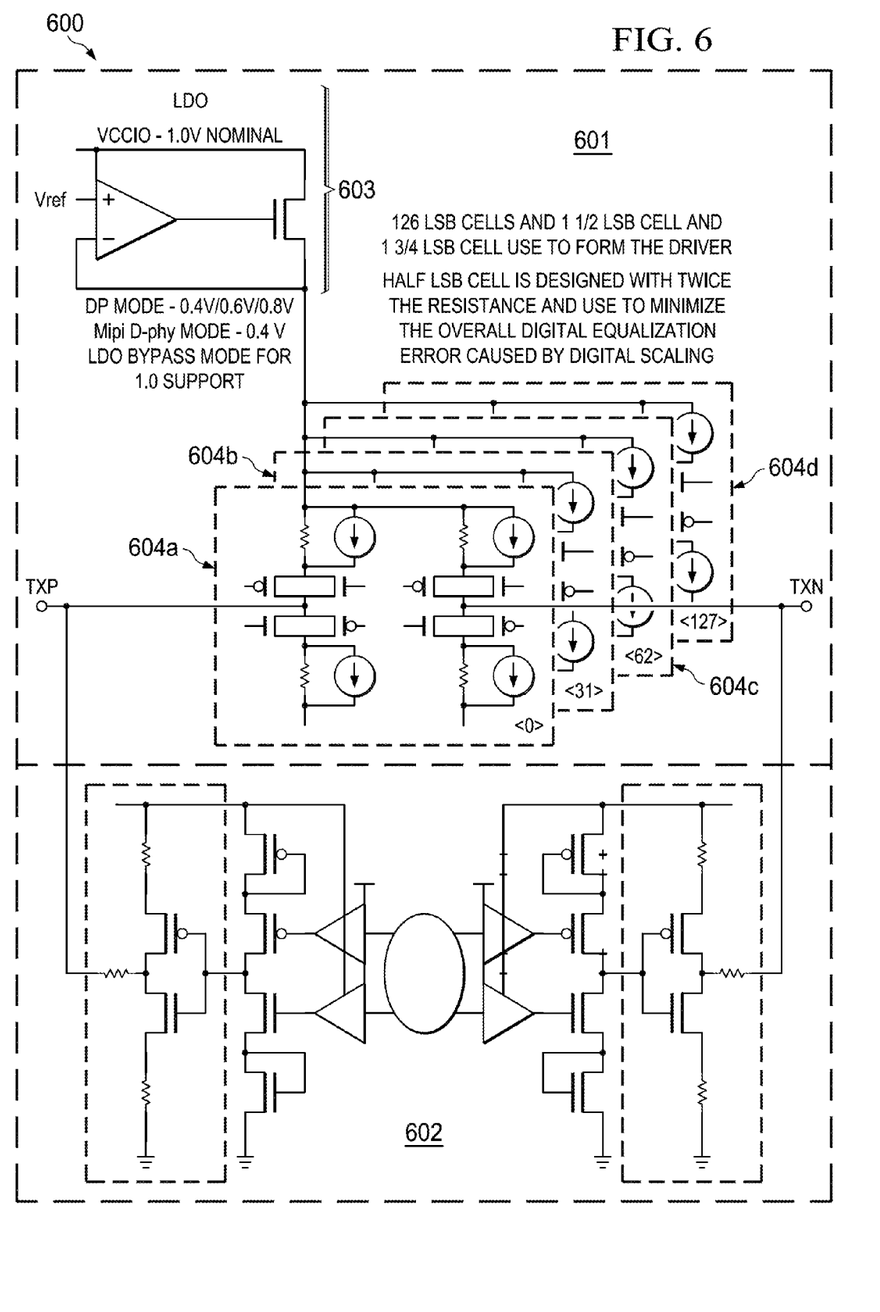
FIG. 6 is a diagram illustrating an embodiment of a transmitter architecture consistent with the present disclosure.

FIG. 6 is a diagram illustrating an embodiment of a transmitter structure 600 consistent with the present disclosure. As shown, transmitter structure 600 includes a high-speed driver domain 601 (having slices 604a-604d), low-speed driver domain 602, and LDO regulator 603. The components shown in the figure enable the transmitter structure 600 to accommodate variable swing specs of both eDP/DP and MIPI D-PHY/M-PHY and therefore may be configured in eDP/DP modes or MIPI D-PHY/M-PHY modes.

The transmitter architecture of the present disclosure does not require a plurality of thick gate devices. Advantageously, the present disclosure supports the fastest specification for DisplayPort (8.1 Gb/s) and the slowest specification for MIPI D-PHY (1.5 Gb/s with 1.2V support).

Figure 7:
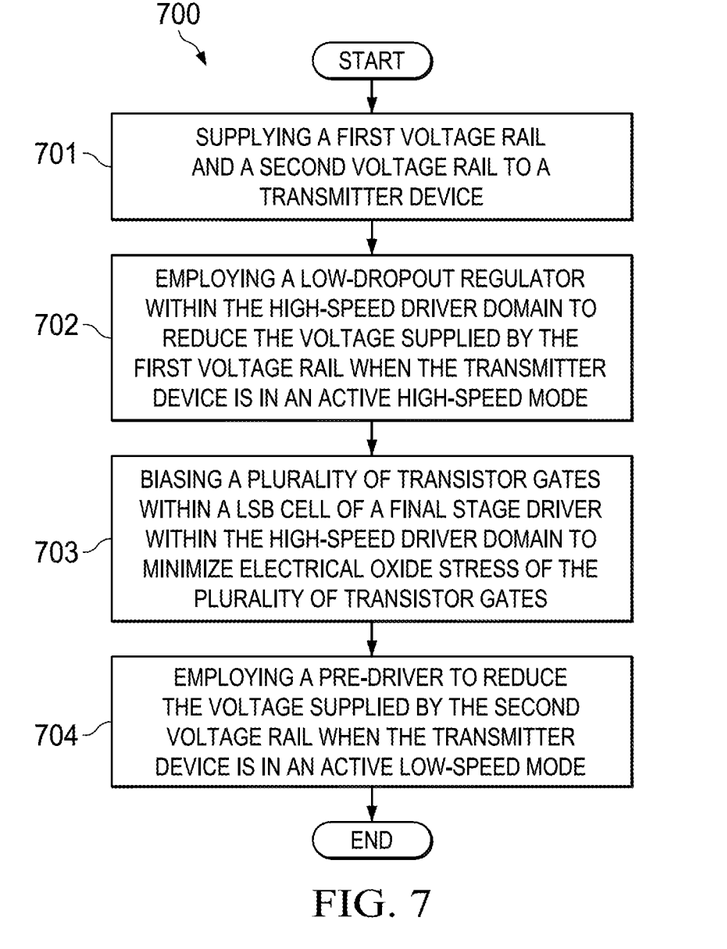
FIG. 7 is a flowchart of a method consistent with the present disclosure.

FIG. 7 is a flowchart 700 of a method consistent with the present disclosure. Block 701 provides supplying a first voltage rail and a second voltage rail to a transmitter device. In some embodiments, the first voltage rail is coupled as an input to a final stage driver of a high-speed driver domain. Next, employing a low-dropout regulator within the high-speed driver domain to reduce the voltage supplied by the first voltage rail when the transmitter device is in an active low-speed mode according to block 702. As previously described, the low-dropout regulator may reduce the voltage such that the transmitter device can achieve high transmission speeds.

Flowchart 700 proceeds to block 703—biasing a plurality of transistor gates within a LSB cell of a final stage driver within the high-speed driver domain to minimize electrical oxide stress of the plurality of transistor gates. Lastly, employing a pre-driver to reduce the voltage supplied by the second voltage rail when the transmitter device is in an active low-speed mode (block 704). As described in detail with regards to FIG. 5, the pre-driver level shifts the voltage supplied by the second voltage rail to protect the thin-gate devices.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A transmitter device, comprising:
    a high-speed driver domain;
    a low-dropout regulator within the high-speed driver domain wherein the low-dropout regulator is to reduce a first voltage level from a first input voltage source to the high-speed driver domain; and
    a low-speed driver domain coupled to the high-speed driver domain;
    wherein the low-speed driver domain includes a pre-driver wherein the pre-driver is to reduce a second voltage level from a second input voltage source to the low-speed driver domain.

2. The transmitter device of claim 1, wherein the low-dropout regulator reduces the first voltage level of the first input voltage source to at least one of 0.4V, 0.6V, and 0.8V.

3. The transmitter device of claim 1, wherein the pre-driver reduces the second voltage level from the second input voltage source to approximately 0.9V.

4. The transmitter device of claim 1, wherein the high-speed driver domain includes a final-stage driver.

5. The transmitter device of claim 4, wherein the final-stage driver includes a plurality of least-significant bit (LSB) cells.

6. The transmitter device of claim 5, wherein the final-stage driver includes 128 LSB cells.

7. The transmitter device of claim 1, wherein the transmitter device is integrated within a display input/output physical layer.

8. The transmitter device of claim 7, wherein the display input/output (I/O) physical layer includes at least one of a MIPI D-PHY, MIPI M-PHY, DisplayPort PHY, or embedded-DisplayPort PHY.

9. A display I/O physical layer, comprising:
    a hybrid transmitter buffer wherein the hybrid transmitter buffer includes:
    a high-speed driver domain;
    a low-dropout regulator within the high-speed driver domain wherein the low-dropout regulator is to reduce a first voltage level from a first input voltage source to the high-speed driver domain; and
    a low-speed driver domain coupled to the high-speed driver domain;
    wherein the low-speed driver domain includes a pre-driver wherein the pre-driver is to reduce a second voltage level from a second input voltage source to the low-speed driver domain.

10. The display I/O physical layer of claim 9, wherein the low-speed driver domain includes a final-stage driver.

11. The display I/O physical layer of claim 10, wherein the final-stage driver includes a plurality of LSB cells.

12. The display I/O physical layer of claim 9, wherein the hybrid transmitter buffer is a push pull source-series transmitter.

13. The display I/O physical layer of claim 9, wherein the low-speed driver domain includes a PMOS pre-driver.

14. The display I/O physical layer of claim 10, wherein the final stage driver of the low-speed driver domain includes a ballast resistor.

15. The display I/O physical layer of claim 9, wherein the hybrid transmitter buffer is to support MIPI D-PHY, MIPI M-PHY, DisplayPort PHY, and an embedded-DisplayPort PHY.

16. A non-transitory computer readable medium including code which is, when executed, to cause a machine to:
    supply a first voltage rail to a transmitter device of a high-speed driver domain and a second voltage rail to a low-speed driver domain;
    employ a low-dropout regulator within the high-speed driver domain to reduce the voltage supplied by the first voltage rail when the transmitter buffer is in an active high-speed mode; and
    employ a pre-driver within the low-speed driver domain to reduce the voltage supplied by the second voltage rail when the transmitter device is in an active low-speed mode.

17. The non-transitory computer readable medium of claim 16, wherein when the transmitter device is in an active low-speed mode, the transmitter device transmits data at a rate less than 2.0 Gb/s and when the transmitter device is in an active high-speed mode, the transmitter buffer transmits data at a rate greater than 5 Gb/s.

18. The non-transitory computer readable medium of claim 16, wherein when the transmitter device is in an active low-speed mode, the transmitter device transmits data at a rate of approximately 1.5 Gb/s and when the transmitter device is in an active high-speed mode, the transmitter buffer transmits data at a rate of approximately 8.1 Gb/s.

19. The non-transitory computer readable medium of claim 16 further comprising code to bias a plurality of transistor gates within a LSB cell of a final stage driver within the high-speed driver domain to minimize electrical oxide stress of the plurality of transistor gates.

20. The non-transitory computer readable medium of claim 16, wherein when the transmitter buffer is active, the pad capacitance at the socket pins is less than 1 pF.

* * * * *